(12) United States Patent
Szentmihalyi

(10) Patent No.: US 8,231,298 B2
(45) Date of Patent: Jul. 31, 2012

(54) CONNECTING ARRANGEMENT

(75) Inventor: Volker Szentmihalyi, Gutach (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 467 days.

(21) Appl. No.: 12/488,187

(22) Filed: Jun. 19, 2009

(65) Prior Publication Data

US 2009/0317182 A1    Dec. 24, 2009

Related U.S. Application Data

(60) Provisional application No. 61/074,374, filed on Jun. 20, 2008.

(51) Int. Cl.
*F16D 1/06*    (2006.01)

(52) U.S. Cl. ..... 403/1; 403/299; 403/359.5; 403/DIG. 7
(58) Field of Classification Search ............... 403/298, 403/1, 299, 359.5, DIG. 7; 464/139–146
See application file for complete search history.

(56) References Cited

U.S. PATENT DOCUMENTS 3,155,177 A * 11/1964 Fly .................................. 175/67
* cited by examiner

*Primary Examiner* — Victor MacArthur
(74) *Attorney, Agent, or Firm* — Crowell & Moring LLP

(57) ABSTRACT

The invention relates to a connecting arrangement between a shaft end and a joint part in which a collar on a connecting nut engages behind a another collar on the shaft end or on the joint part or on a clamping nut which clamps a bearing on the shaft, and one of the collars is formed by a oval ring received in a groove which facilitates disassembly of the connection formed by the connecting arrangement.

12 Claims, 5 Drawing Sheets

CONNECTING ARRANGEMENT

CROSS REFERENCE TO RELATED APPLICATIONS

This application claims priority from provisional patent application no. 61/074,374, filed Jun. 20, 2008, the entire disclosure of which is incorporated herein by reference.

BACKGROUND OF THE INVENTION

The invention relates to a connecting arrangement between an axially fixed shaft end, in particular comprising a shaft end projecting from a gearbox, differential, wheel hub or the like and a constant velocity joint, wherein one of the joint parts is fixed or is to be fixed in a twistproof manner to the shaft end. A nut which clamps the bearing of the shaft end can also be provided on the shaft end, wherein a nut connecting the shaft end and the joint part to one another can be screwed with its internal thread at least indirectly onto one of the components (e.g., joint part, shaft end or clamping nut) and the connecting nut has at least one collar which, with a collar provided on one of the other components, forms a connection which is axially fixed in the screwing-on direction of the nut, but which is non-destructively releasable, in particular by means of an ovality provided on at least one of the collars.

Connecting arrangements of this type for a joint inner part on the shaft end of a gearbox or differential are disclosed in FIGS. 1 to 4 of WO 2008/022625. In articulated connections of this type, the joint inner part of a constant velocity joint is screwed via a union nut onto or into a clamping nut (the latter for adjusting the bearing play at the bearing for centering and guiding the gearbox shaft at the end of the gearbox housing) which is screwed onto the gearbox input or output shaft. The connecting nut and/or the joint inner part can comprise a molded-on oval collar, which with another collar, which may be circular, has a connection via the ovality or eccentricity at the joint inner part and/or the connecting nut. Production of the connecting nut or possibly the joint inner part with the ovality is relatively complex and costly and also entails a relatively large loss of material.

SUMMARY OF THE INVENTION

It is an object of the present invention to provide an easily assembled and economical joint connection which is easy to operate and has a high level of operational reliability.

It is a further object of the invention to improve upon the prior art known from, for example, DE 36 17 983, U.S. Pat. No. 6,315,671 (=WO 98/35174), U.S. Pat. No. 6,780,114, DE 103 42 494, DE 103 44 703 and US 2008/107477 (=DE 10 2004 048 079).

These and other objects have been achieved in accordance with the present invention by providing a joint connection in which an oval collar provided on one of the components is formed by a ring mounted in a groove of at least one of the components, (i.e., the connecting nut, shaft end, joint part or clamping nut), said ring having oval regions projecting out of the groove. The ring provided with an ovality can be a spring ring and the connecting nut can suitably be a locking nut. The collar having the ovality can therefore be a spring ring with its oval regions fixed radially, and in particular, facing outwardly, in a groove of the shaft end, the joint inner part or the clamping nut or a spring ring fixed in a groove of the locking nut, said spring ring having oval, and in particular inwardly facing, regions at the locking nut.

With a configuration of this type comprising at least one spring ring which has an ovality, a joint connection can be created which is easy to assemble and economical to produce.

Although the joint connection can also be created via a shaft to the joint outer part of a constant velocity joint, the connection of a gearbox input shaft or output shaft to the joint inner part of a constant velocity joint will be described below.

The ring which has an ovality, as described above, can itself be fixed in the locking nut and engage with the oval regions behind a collar provided on the joint inner part, such as a molded-on collar or a spring clip fixed in a groove and projecting radially outwardly, and impinge axially upon the joint inner part when the fastening nut is screwed onto the shaft end and the joint inner part is pulled on with its spline inner toothing on the spline outer toothing on the shaft end.

The arrangement can, however, also be configured so that the ring which has an ovality is provided in the joint inner part and is overlapped by a radially outwardly extending collar of the locking nut. The locking nut can—as in the foregoing example—engage the locking nut directly at an outer thread of the shaft end or at an outer thread arranged at the outer region of a nut, for example, a clamping nut.

An optional preferred embodiment which is particularly advantageous for many applications is produced if the ring which has an ovality is fixed directly in the shaft end, wherein the ring is overlapped by the radially inwardly facing collar regions of a locking nut which can be screwed with its inner thread onto the outer thread of the joint inner part and thereby pulls the joint inner part with its longitudinal toothing onto similar toothing on the shaft end.

For many applications, however, it may be advantageous if the collar which is effective during pulling on of the locking nut and is provided thereon is also a spring ring, which can have an essentially circular form. This collar can also be molded on, as mentioned above.

For some applications, it can also be advantageous if the other collar also has an ovality, so that following the threading on and during pulling on of the joint, two collars which have an ovality cooperate. An embodiment of this type can facilitate the "threading on" of the locking nut and, in particular, the inclinations of both parts relative to one another can thereby be increased.

It is particularly advantageous if, in addition to the collar which is effective during the pulling-on, one of the components has a second collar which is effective during pushing-off of the joint. This collar provided for pushing off the joint is suitably provided at an axial spacing on the same component which carries the collar for pulling on the joint inner part onto the toothing of the gear input part or output part, and the collar of the other component involved in the clamping and/or joint connection is provided at the spacing therebetween.

The collar against which force is exerted during pushing-off may be a molded-on collar or a spring ring with an essentially circular outer diameter which is also provided in a groove.

The term "ovality" should be understood to mean the configuration wherein a collar, ring or the like has one or more radial origins, for example, arms, which are overlapped by inclination of a connecting nut, (or vice versa) by pivoting over the nut or pivoting in the other component, e.g., the joint inner part, and subsequent axial alignment, and wherein force transmission in the axial direction is possible, wherein this connection is releasable, and therefore also via connections constructed as "bayonet fixings".

In a further preferred embodiment of the invention, the shaft end, the joint inner part or the clamping nut has an oval groove in which a collar engages with the connecting nut.

BRIEF DESCRIPTION OF THE DRAWINGS

The invention will be described in greater detail hereinafter with reference to illustrative preferred embodiments shown in the accompanying drawing figures, in which:

FIG. 1a is a sectional view taken along the line A-A of FIG. 1;

FIG. 1b is a detail view from FIGS. 1 and 1a;

FIGS. 1c and 1d depict alternate embodiments of the ring-shaped connecting element according to FIGS. 1, 1a and 1b;

FIGS. 3a and 3b show alternative seal arrangements for the collecting arrangement of FIG. 3;

In the drawings, similar parts are identified by the same reference numerals.

DETAILED DESCRIPTION OF PREFERRED EMBODIMENTS

Figure 1:
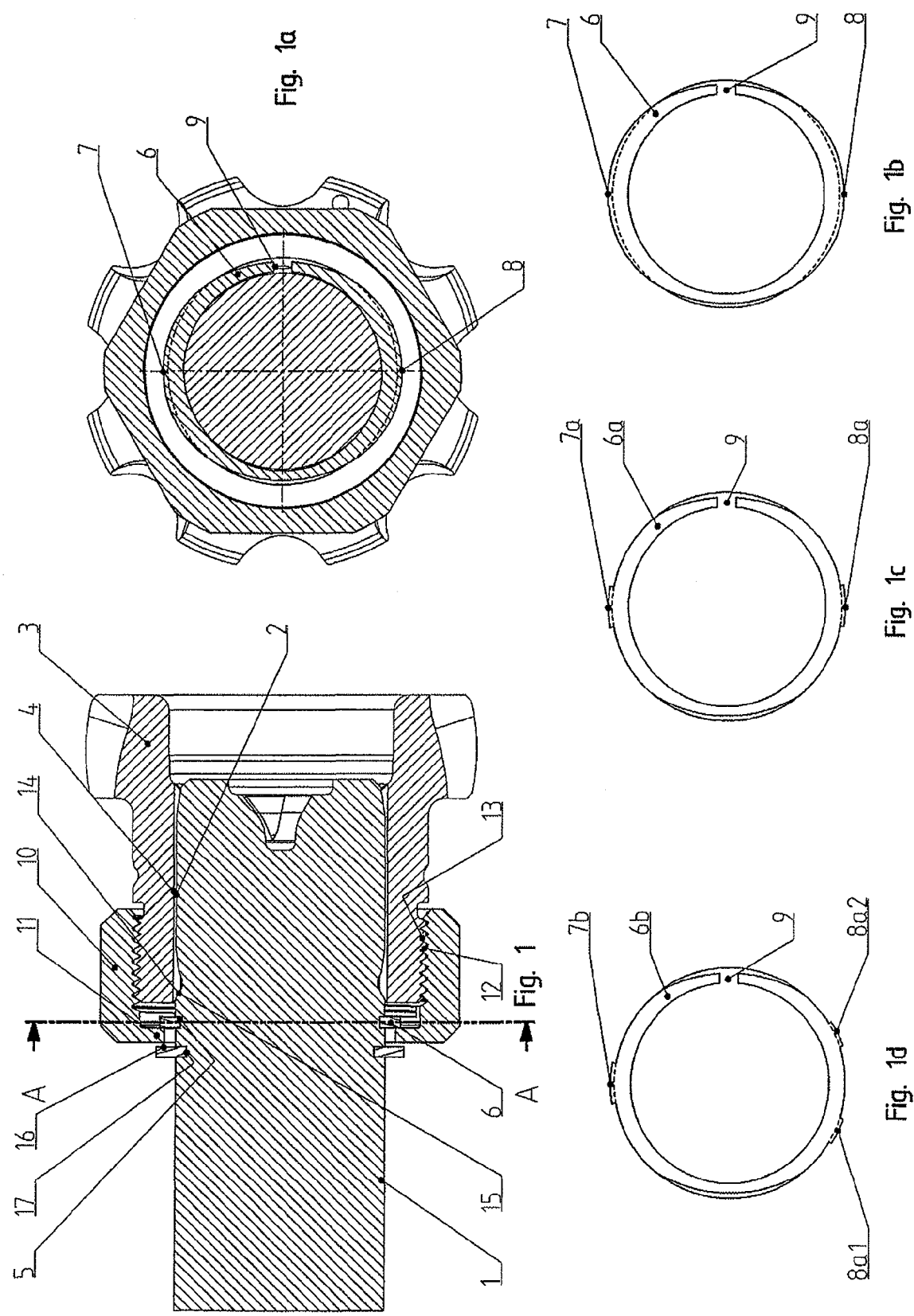
FIG. 1 sectional view of a first embodiment of the articulated connection according to the invention.

FIG. 1 shows a shaft end 1 projecting from a gearbox or a differential or the like with spline toothing 2 applied radially on the outside and a joint inner part 3 of a constant velocity joint with spline toothing 4 applied radially on the inside.

An oval spring ring 6 is contained in a groove 5 of the shaft end 1, and is shown separately in FIG. 1b. The spring ring 6 has mutually opposed oval regions 7, 8 and a slot 9.

A union nut 10 which is configured as a locking nut engages with a collar 11, which in this case has a circular configuration, behind the oval regions 7, 8 of the ring 6. The nut 10 has an inner thread 12 with which it is screwed onto the outer thread 13 of the joint inner part 3. It pulls or presses the joint inner part 3 with a centering contour 14 provided on the latter against a counter-centering contour 15 on the shaft end.

On the side facing axially away from the spring ring 6, the shaft 1 has another collar in the form of a spring ring 16 which, when the joint inner part 3 is pushed off the shaft end 1 during disassembly, is impinged upon by the shaft when the nut is turned in the unscrewing direction.

The pushing-off collar 16 can also be configured as a collar molded onto the shaft 1, although it is evident that material can be spared on the shaft end when a spring ring is inserted into a groove.

The ovality of the spring ring 6 and the inner contour of the collar 11 are matched to one another so that the locking nut, when it is tilted so that its axis deviates from the axis of the shaft end, can be tilted and/or placed inverted over the oval regions 7, 8. The collar 6 engages behind these regions 7, 8 if the axis of the nut and the shaft at least approximately match. The nut is then in a condition pre-assembled on the shaft end. The joint inner part 3 can then be pulled over the nut after the joint inner part has previously been pushed partially onto a freely moving region.

FIGS. 1c and 1d show rings 6a, 6b wherein the "ovality" is formed by projecting arms 7a and 7b and—on the opposing side—by the arm 8a according to FIG. 1c and by arms 8a1 and 8a2 according to FIG. 1b.

Figure 2:
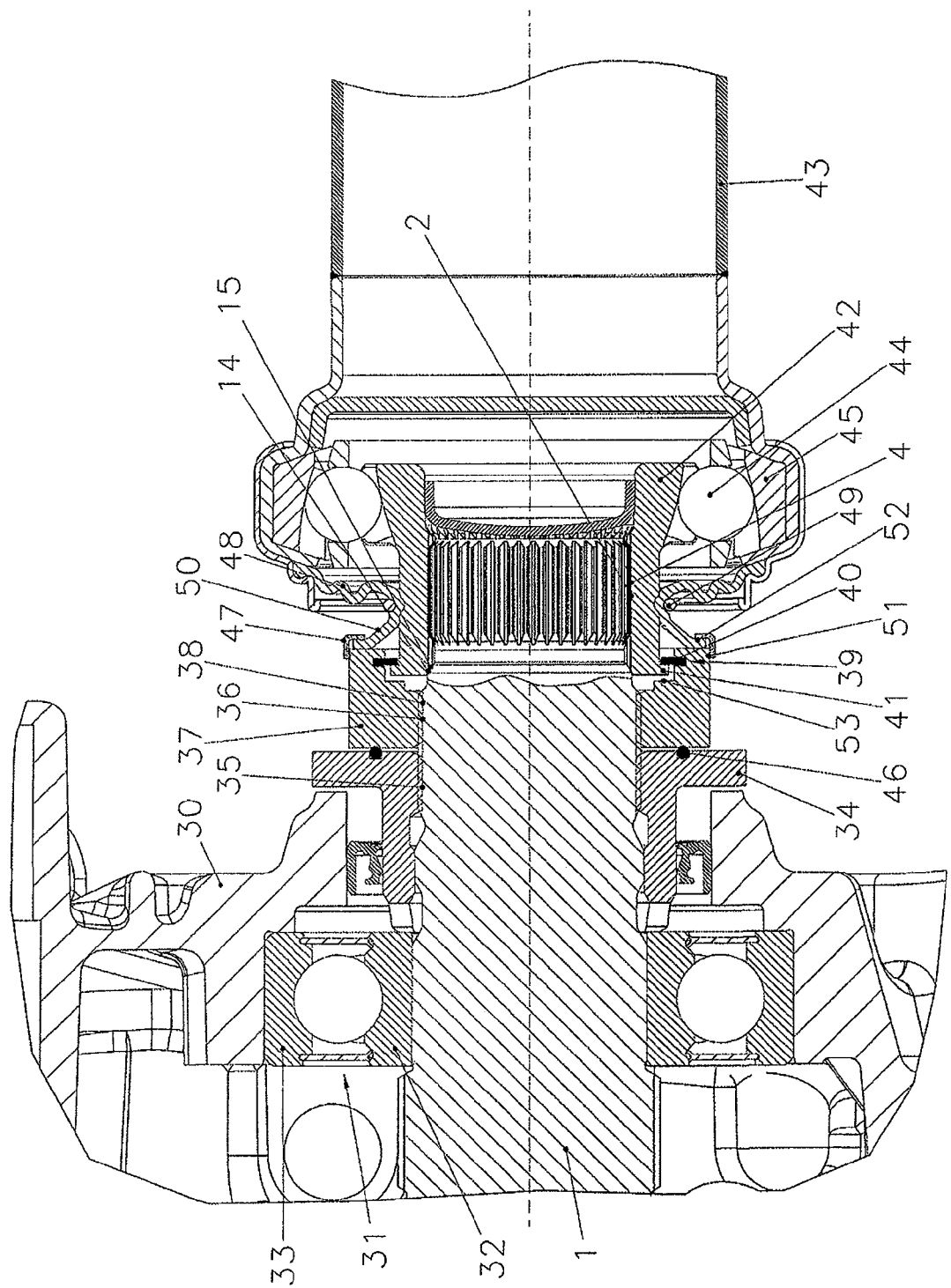
FIG. 2 is a sectional view of a first alternate embodiment of the connecting arrangement of the invention.

FIG. 2 shows the gearbox and/or differential input or output shaft 1, which is rotatably mounted in a housing 30 (shown partially) via a bearing 31. The inner ring 32 and the outer ring 33 of the bearing 31 are tensioned by means of a clamping nut 34 and the bearing play is adjusted therewith.

The clamping nut 34 is screwed with its inner thread 35 onto an outer thread 36 of the shaft 1. Also screwed onto the outer thread 36 is a connecting nut 37 via the inner thread 38 thereof, said connecting nut 37 overlapping, with an oval shaped spring ring 40 accommodated in the groove 39, a collar 41 of the joint inner part 42 and clamping the joint inner part against the counter-contour 15 via the molded-on contour 14. The collar 41 is a circular collar, although it can have a suitable ovality. The collar 41 and/or the spring ring 40 are matched to one another such that the connecting nut 37 can be pushed onto the joint inner part 42 in a suitable inclined position of its axis relative to the axis of the joint inner part 42 via the oval regions of the spring ring 40 and, after bringing the axis of the joint inner part into an approximately similar axial position to that of the nut, the oval regions of the spring ring 40 engage behind the collar 41 in the position shown and thus by means of the nut 37—once the joint inner part has initially been pushed in freely moving manner over the toothing 2/4—when said nut is twisted, the joint inner part 42 can be fully drawn with its inner toothing 4 onto the outer toothing 2, until it is held centered by means of the stops 14, 15. Thus torque can then be transmitted from the shaft 1 via the joint inner part 42 to the joint shaft 43, wherein balls 44 are provided between the inner joint part 42 and the outer joint part 45.

Sealing between the clamping nut 34 and the union nut 37 takes place by means of a seal 46 provided therebetween and the sealing of the union nut 37 relative to the joint inner part 42 is carried out via a preferably elastic tension ring 47 which is provided with an L-shaped cross-section, which presses an attachment 50 which is molded integrally with the bellows 48 (between the joint inner part 42 and the joint outer part 45) against the front face of the connecting nut 37. For this purpose, the tension ring 47 is provided with two beads 51, 52, wherein a groove is provided for the bead 51 in the union nut 37. A ring 49 presses the bellows 48 into a groove in the joint inner part 42.

Provided on the connecting nut 37 is a pushing-off edge 53, which presses against the collar 41 formed as the counter-contact region when the nut and/or the joint is unscrewed, and thus separates the joint from the shaft.

Figure 3:
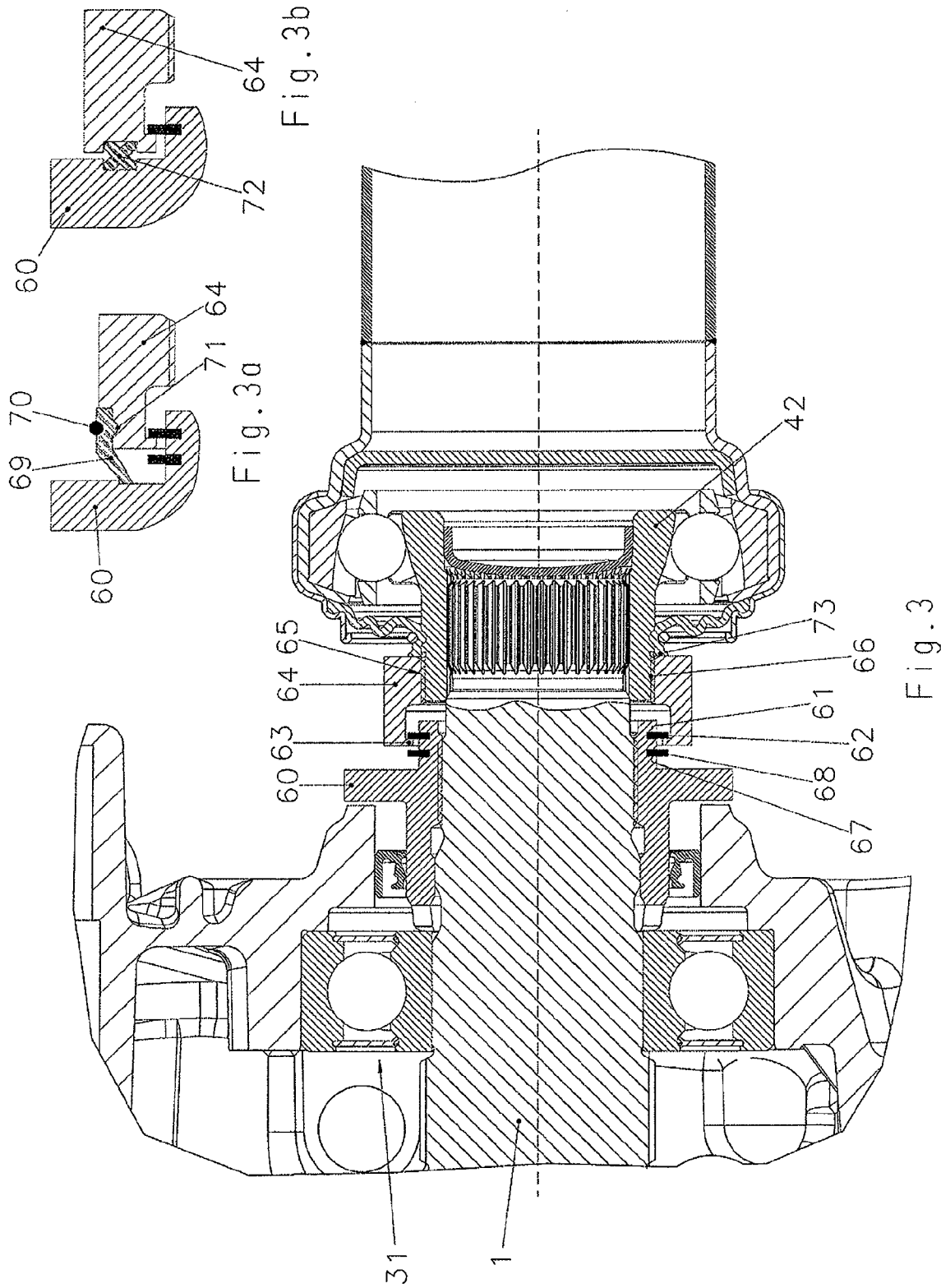
FIG. 3 is a sectional view of a second alternate embodiment of the connecting arrangement of the invention.

FIG. 3 shows a clamping nut 60 screwed onto the shaft 1 for clamping and/or adjusting the play in the bearing 31.

The oval regions of a spring ring 62 fixed in a groove 61 are at least partially overlapped by a collar 63 of the connecting nut 64. The connecting nut 64 is mounted on the clamping nut 60 in the previously described manner and is firstly pre-assembled thereon. Once the joint inner part 42 has been partially pushed on with its inner toothing onto the outer toothing of the shaft 1 and the nut 64 has been screwed, via its inner thread 65, onto the outer thread 66, the connection shown here is made.

A second spring ring 68 is inserted into a further groove 67 of the clamping nut 60 and thus forms a contour which is impinged upon by the counter-contour in the form of the collar 63 during pushing-off.

The possibility of a seal between the clamping nut 60 and the connecting nut 64 is shown in FIGS. 3a and 3b.

In FIG. 3a, a lip seal 69 which is secured via a spring ring 70 and a groove 71 on the nut 64 is provided on an outer region of the nut 64.

In FIG. 3b, an axial seal 72 is fixed in respective peripheral grooves of both nuts 60 and 64.

The sealing of the joint inner part relative to the connecting nut 64 is provided here via a sealing surface 73 which is clamped against the nut.

Figure 4:
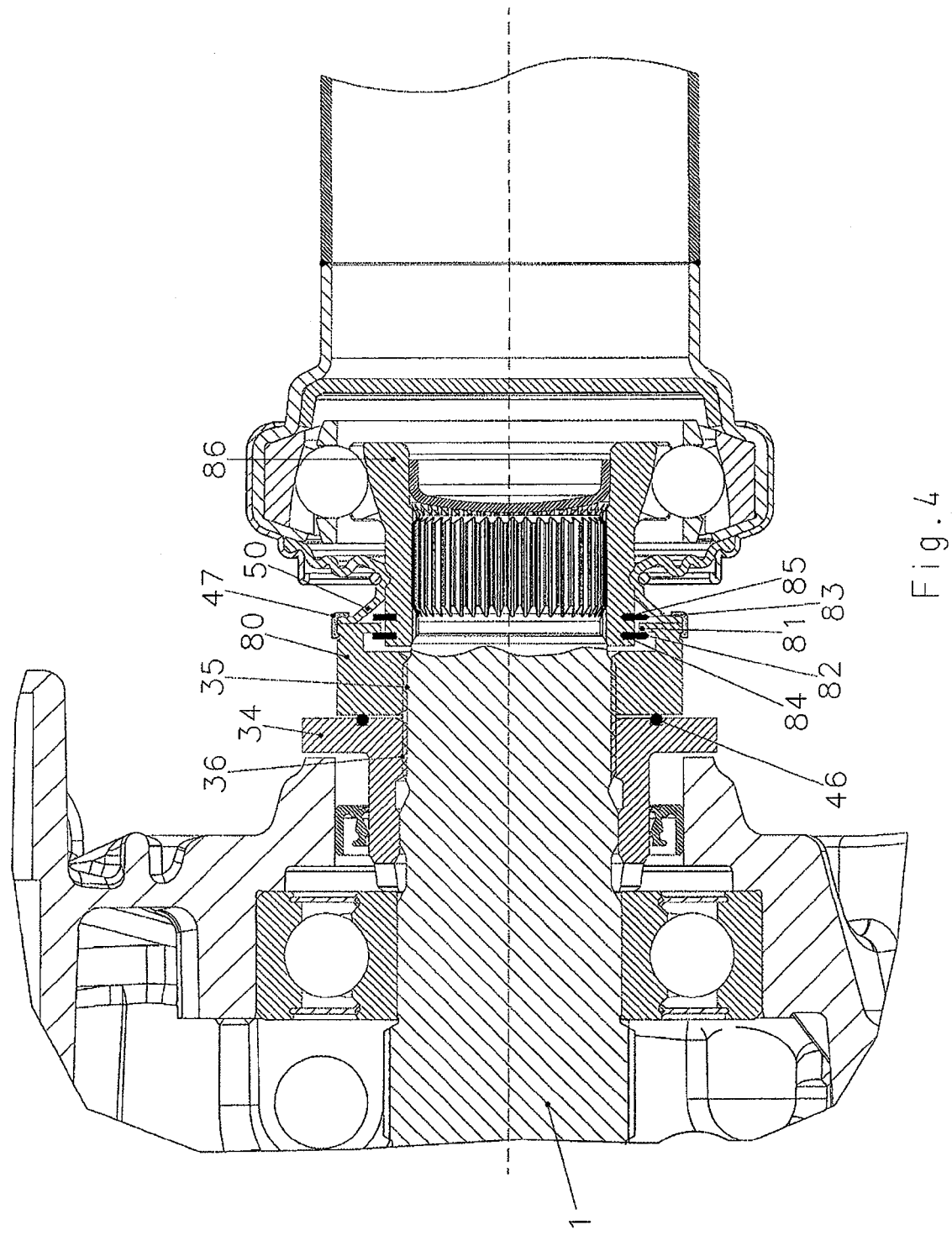
FIG. 4 is a sectional view of a third alternate embodiment of the connecting arrangement of the invention.

In the embodiment of FIG. 4, similarly to FIG. 2, a clamping nut 34 is screwed with its inner thread 35 onto the outer thread 36 of the shaft end 1. Also provided on the outer thread 36 is a connecting nut 80 which has a collar 81 which is arranged axially between two spring rings 82, 83 and which are fixed in grooves 84, 85 of the joint inner part 86. The spring ring 82 is an oval spring ring, that is, with oval surfaces facing radially outwardly, onto which the union nut 80 is mounted in the manner previously described. Here also, clamping nuts 34 and connecting nuts 80 are sealed relative to one another via a sealing ring 46, and a seal 47 and 50 is provided for sealing between the joint inner part 86 and the connecting nut 80.

The second spring ring 83 serves to press the joint and/or the shaft off the shaft end 1.

Figure 5:
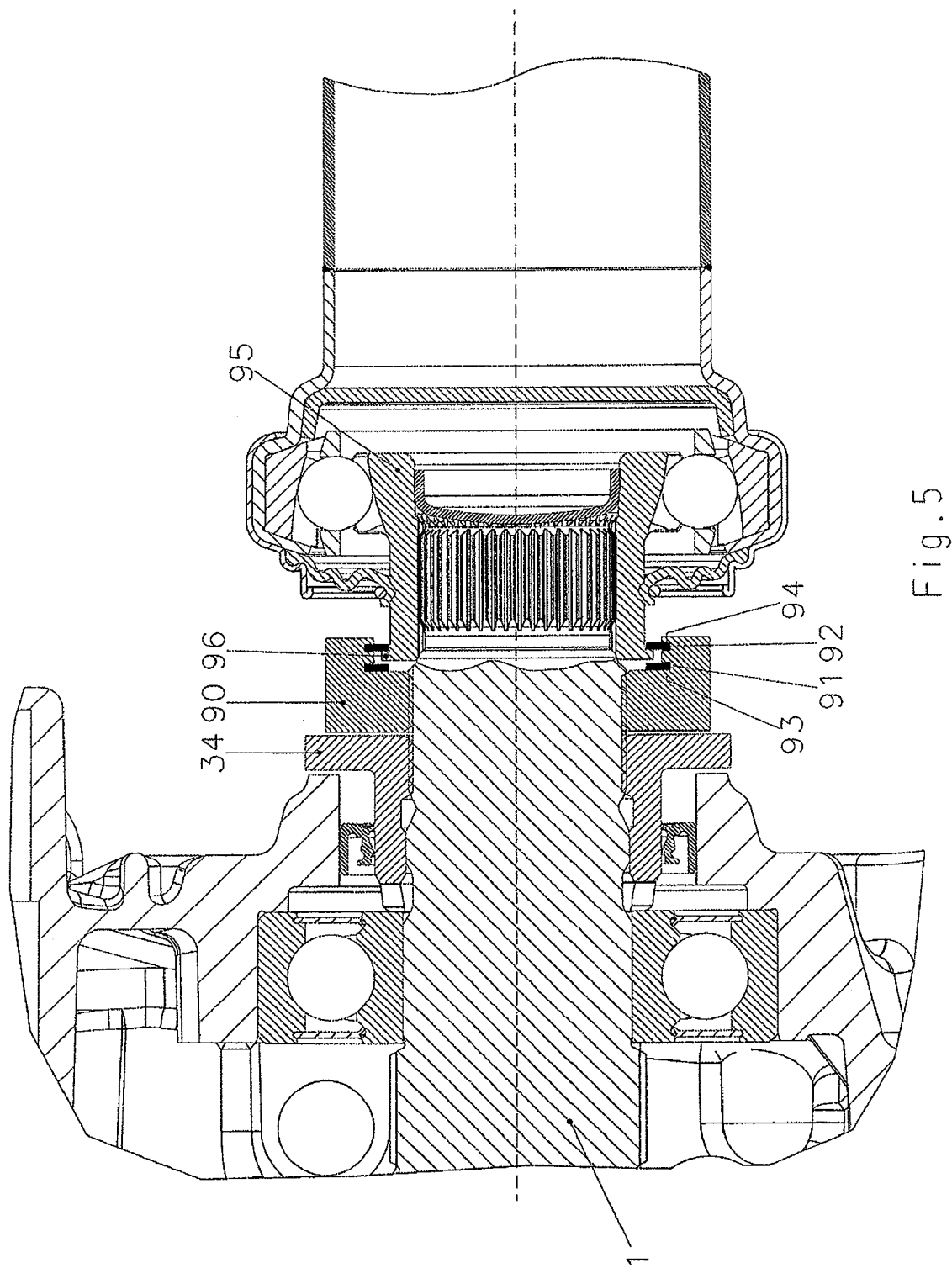
FIG. 5 is a sectional view of a fourth alternate embodiment of the connecting arrangement of the invention.

In the illustrative embodiment according to FIG. 5, a clamping nut 34 is again screwed onto the shaft end 1 and the connecting nut 90 has two spring rings 91, 92 in grooves 93 and 94. A collar 96 mounted integrally on the joint inner part 95—which could, alternatively, consist of a spring ring inserted into a groove of the joint inner part 95—is axially accommodated between the two spring rings 93, 94. In this illustrative embodiment, the ring 94 has the ovality and is pre-assembled on the joint inner part in the manner described by inclination and subsequent pivoting in onto the joint inner part. The spring ring 93 performs the pushing-off function.

The collar 96 may also additionally or intrinsically have an ovality, or it may be formed by a spring ring which, optionally in addition to the spring ring 94, has an ovality.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A connecting arrangement comprising:
   an axially fixed shaft end, a constant velocity joint, and a connecting nut;
   wherein a part of said constant velocity joint engages said shaft end in a rotationally fixed manner;
   wherein said connecting nut for connecting said shaft end and said part of said constant velocity joint to one another has an internal thread;
   wherein said connecting nut has at least one collar which, together with another collar forms a connection which is axially fixed in the screwing-on direction of said connecting nut, but which is releasable by an ovality provided on at least one of said collars;
   wherein the collar having said ovality is formed by a ring introduced into a groove, said ring having oval regions projecting out of said groove.

2. The connecting arrangement as claimed in claim 1, wherein said internal thread of said connecting nut can be screwed at least indirectly onto said part of said constant velocity joint or onto said shaft end;
   wherein said another collar is provided on said part of said constant velocity joint or said shaft end; and
   wherein at least one component selected from the group consisting of said connecting nut, said shaft end, and said part of said constant velocity joint comprises said groove.

3. The connecting arrangement as claimed in claim 1, wherein one component selected from the group consisting of said part of said constant velocity joint and said shaft end has a second collar.

4. The connecting arrangement as claimed in claim 2 or 3, wherein said another collar and said second collar being provided together on one component selected from the group consisting of said part of said constant velocity joint and said shaft end;
   wherein said another collar and said second collar being axially spaced apart; and
   wherein said collar of said connecting nut is accommodated axially between said another collar and said second collar.

5. The connecting arrangement as claimed in claim 3, wherein said second collar being a spring ring which is provided in a groove.

6. The connecting arrangement as claimed in claim 5, wherein one component selected from the group consisting of said part of said constant velocity joint, said shaft end and said clamping nut has a second collar.

7. The connecting arrangement as claimed in claim 6, wherein said second collar being a spring ring which is provided in a groove.

8. The connecting arrangement as claimed in claim 1, further comprising:
   a clamping nut provided on said shaft end;
   wherein said internal thread of said connecting nut can be screwed at least indirectly onto a component selected from the group consisting of said part of said constant velocity joint, said shaft end, and said clamping nut;
   wherein said another collar is provided on a component selected from the group consisting of said part of said constant velocity joint, said shaft end and said clamping nut; and
   wherein at least one component selected from the group consisting of said connecting nut, said shaft end, said part of said constant velocity joint, and said clamping nut comprises said groove.

9. The connecting arrangement as claimed in claim 8 or 6, wherein said another collar and said second collar being provided together on one component selected from the group consisting of said part of said constant velocity joint, said shaft end, and said clamping nut;
   wherein said another collar and said second collar being axially spaced apart; and
   wherein said collar of said connecting nut is accommodated axially between said another collar and said second collar.

10. The connecting arrangement as claimed in claim 1, wherein said connecting nut is a locking nut.

11. The connecting arrangement as claimed in claim 1, wherein said ring is a spring ring.

12. The connecting arrangement as claimed in claim 1, wherein said part of said constant velocity joint is an inner part of said constant velocity joint and is provided with an external thread.

* * * * *